United States Patent [19]

Vermersch

[11] Patent Number: 5,045,766
[45] Date of Patent: Sep. 3, 1991

[54] EXCITATION DEVICE FOR ELECTROMAGNETIC ACTUATOR

[75] Inventor: Alain Vermersch, Velizy, France

[73] Assignee: Thomson Tubes Electroniques, Boulogne Billancourt, France

[21] Appl. No.: 528,033

[22] Filed: May 23, 1990

[30] Foreign Application Priority Data

May 30, 1989 [FR] France ............................ 89 07083

[51] Int. Cl.⁵ .......................................... H02P 1/22
[52] U.S. Cl. ................................... 318/293; 318/257
[58] Field of Search ............................ 318/256–267, 318/280, 281, 293

[56] References Cited

U.S. PATENT DOCUMENTS

| | | | |
|---|---|---|---|
| 3,683,253 | 8/1972 | Rummel et al. ............... | 318/331 |
| 3,851,235 | 11/1974 | Harrison ...................... | 318/257 |
| 4,206,394 | 6/1980 | Flandorfer .................... | 318/640 |
| 4,562,393 | 12/1985 | Loyzim et al. ................ | 318/599 |
| 4,703,238 | 10/1987 | Palmin et al. . | |
| 4,800,324 | 1/1989 | Kuttner ........................ | 318/293 |

Primary Examiner—Bentsu Ro
Attorney, Agent, or Firm—Roland Plottel

[57] ABSTRACT

A device for the electrical excitation of the coil or coils of an electromagnetic actuator, especially that of a linear motor, the coil of which has a low self-inductance. This coil is supplied by a bridge of transistors. The error between a reference voltage and a voltage proportional to the current in this coil is used to turn off a pair of transistors of the bridge, and simultaneously saturate a transistor of the other pair and make the other transistor work in linear mode. Two electronic switches and one sign discriminator are used to this end.

6 Claims, 1 Drawing Sheet

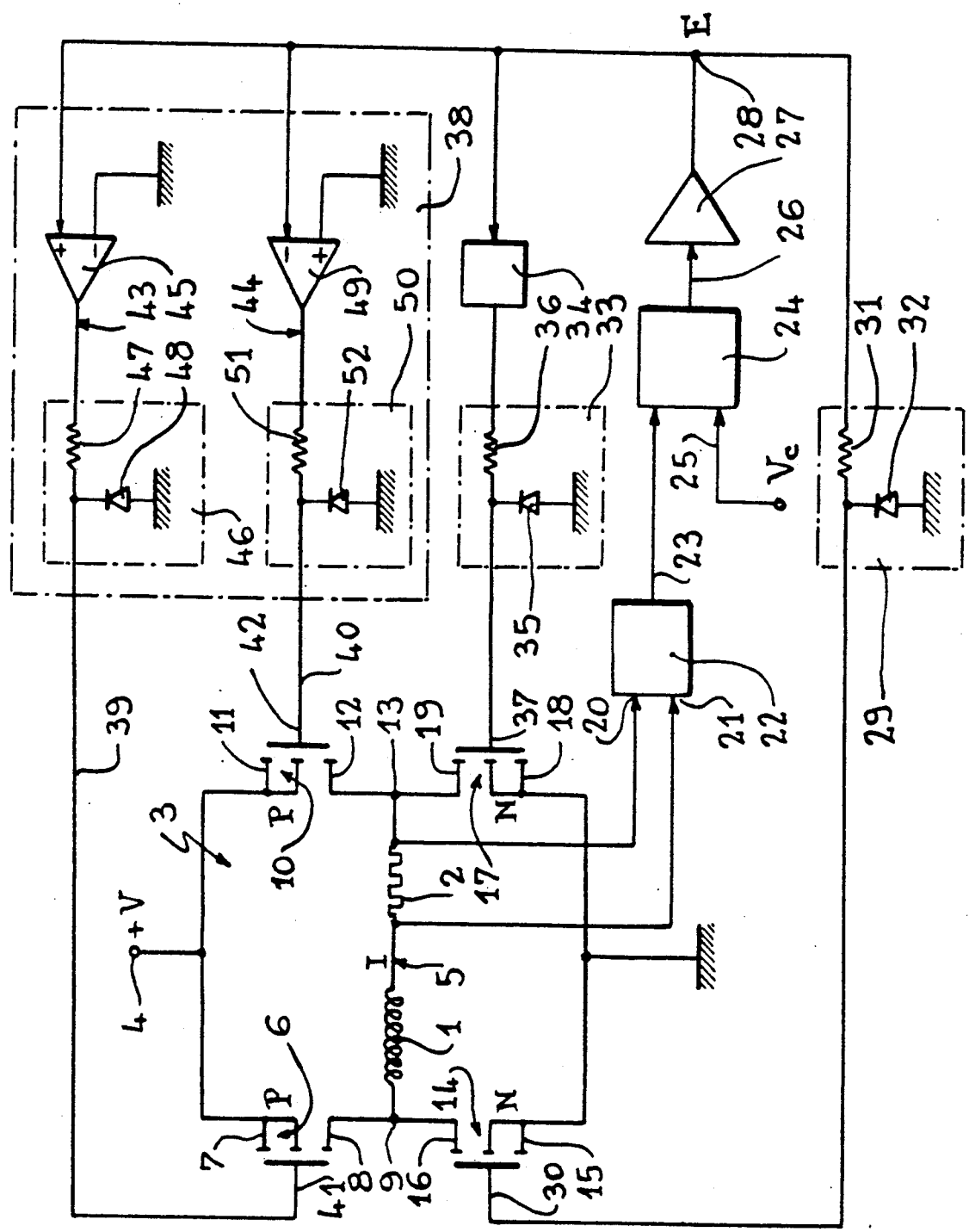

EXCITATION DEVICE FOR ELECTROMAGNETIC ACTUATOR

BACKGROUND OF THE INVENTION

1. Field of the Invention

The present invention pertains to an electrical excitation device for the coil or coils of an electromagnetic actuator, and especially of an electromagnetic actuator with linear movement.

2. Description of the Prior Art

The coils of electromagnetic actuators with linear movement have a number of important applications in a very wide variety of control actuators, such as electric door openers, electromagnets with mobile cores, loudspeaker motors, linear motors for servo-controlled mechanisms, control devices for the tuning piston of a microwave resonant cavity etc.

There is a known way to achieve the electrical power excitation of the coil of an electromagnetic linear motor by means of a bridge of power transistors, the control electrodes (gates in the case of field-effect transistors and bases in the case of bipolar transistors) of which are driven by means of a pulse-width modulation and chopping amplifier. When the reference voltage is zero, these control electrodes are driven by symmetrically chopped signals (square-wave signals for example) so that the mean current in the coil is zero. When this reference voltage has a value, for example a positive value, tending to make the core of the actuator move in a first direction, these signals are chopped dissymmetrically in a first direction by the modulator, so that the mean current in the coil has a certain value, for example a positive value, that depends on the degree of the modulation, i.e., in fact on the amplitude of the error voltage that controls the modulator. By contrast, when this same reference voltage has a value, negative this time, tending to make this core move in the other direction, these very same chopped signals are chopped dissymmetrically in the other direction. This gives a negative value to the above-mentioned mean current flowing through the electromagnetic actuator.

One drawback of this conventional device is the risk of inducing spurious voltages due to this chopping of power at varying levels of frequency. As a rule, the movable magnetic core is associated with a position sensor which operates in the general position feedback loop for this core, with its associated electronic processing system being often placed in the same casing as the above-mentioned power amplifier. This raises problems in controlling spurious voltages that are all the more severe as the signal given by this position sensor must be as precise as possible.

Furthermore, especially in the case of linear motors with short response times, it is desirable to use coils with a small number of turns having a high current going through them, rather than coils with a large number of turns having a lower current going through them, so as to obtain optimum heat dissipation. It follows that the self-inductance of the linear motor then has a low value so that, when the reference voltage is zero and when, consequently, the successive voltage pulses at output of the motor are balanced in both directions, although the motor is mechanically fixed, its coils are crossed by an AC current with an rms value that is far from negligible given the excessively small damping due to the excessively low self-inductance of these coils. A non-negligible electrical power is thus dissipated at rest in these coils.

To obtain a low rms current at rest in these coils, it would be necessary to work with a very high chopping frequency (of the order of one to several megahertz). This, firstly, is incompatible with efficient working of the power transistors and, secondly, does not resolve the above-mentioned problem of controlling spurious voltages.

SUMMARY OF THE INVENTION

The invention seeks to overcome these drawbacks. To this effect, it concerns a device for the electrical excitation of the coil or coils of an electromagnetic actuator, capable of causing a shift in either direction, this device having a bridge of power transistors that is capable of directly supplying this coil, or these coils, in either direction, as well as a device capable of measuring the error between a reference voltage representing the current to be applied to this coil or to these coils and a voltage proportional to the current that flows through them, wherein means are provided so that, when this error voltage is positive for example, firstly they turn off the pair of transistors of the bridge which, if they were on, would make the current flow in a first direction in this coil or these coils and, secondly, they turn one of the transistors of the other pair entirely on while, at the same time, making the other transistor of this other pair work in substantially linear mode, in such a way that the current flowing through them—and therefore flowing through this coil or these coils in the second direction—then varies practically linearly with this error voltage, and vice versa when this error voltage is, in this example, negative, in which case the two transistors of this other pair are off and the two transistors of the first pair are on, with one transistor of this first pair being totally on while the other pair works in substantially linear mode so that the current, which then flows through the coil or the coils in said first direction varies, this time too, practically linearly with the error voltage.

According to an advantageous embodiment, the above-mentioned error voltage is applied simultaneously:

to a first electronic switch consisting, for example, of a diode, which is connected between the control electrode (base for a bipolar transistor, gate for a field-effect transistor) of a first transistor of said "other pair" of the bridge and a potential (generally the ground, namely 0 volts) for turning off this very transistor, said switch being actuated by the sign (+ or −) of this error voltage to be closed, and then turn this transistor off, when this error voltage has a first sign (for example −) and to be open when this error voltage has the opposite sign (for example +) in order to enable this same transistor then to work in an essentially linear mode;

through an analog inverter to a second electronic switch similar to the first one, this second switch being, just like the first switch, connected between the control electrode (base or gate) of the first corresponding transistor of the first pair of the bridge and a switch-off potential of this same transistor, this second switch being actuated by the sign of this error voltage inversely with respect to the first switch, namely actuated to be closed, and then to turn this transistor off, when this error voltage has the other sign (+ in the above-mentioned example), and, when this error voltage has the first sign (— in the example), actuated to be open in order to enable this same transistor to work then in a substantially linear mode; and to a sign discriminator controlled by the sign of this error voltage so as to apply a switch-off voltage to the second transistor of the pair, the other transistor of which is turned off by this error voltage (through the associated electronic switch), and so as to apply a saturation voltage to the second transistor of the other pair.

BRIEF DESCRIPTION OF THE DRAWING

In any case, the invention will be understood more clearly and its advantages and other characteristics will emerge from the following description of a non-restrictive embodiment, made with reference to the single appended figure which is a simplified electrical diagram of an excitation device for the coil of an electromagnetic actuator with linear movement, the core of which can move in either direction.

DESCRIPTION OF A PREFERRED EMBODIMENT

Referring to this single figure, the coil of the electromagnetic actuator with linear movement is represented by an induction coil referenced 1.

In a manner known per se, this coil is placed in series with a very low value measuring resistor, in the diagonal 5 of a bridge 3 of power transistors, that is supplied between the +V DC supply terminal 3 and the ground, and comprises:

- a first power FET 6 of the P channel type, the source 7 of which is connected to the supply terminal 4, and the drain 8 of which is connected to a first end 9 of the diagonal 5 of the bridge 3;
- a second FET 10, practically identical to the transistor 6, hence also of the P channel type, the source 11 of which is connected to the supply terminal 4, and the drain 12 of which is connected to the other end 13 of the diagonal 5 of the bridge of transistors 3;
- a third power FET 14, which is of the N channel type and is advantageously complementary to the transistor 10, this FET 10 having its source 15 connected to the ground its drain 16 connected to the end 9 of the diagonal 5 of the bridge; and
- a fourth power FET 17, also of the N channel type, and advantageously complementary to the transistor 6, this FET 17 having its source 18 connected to the ground and its drain 19 connected to the other end 13 of the diagonal 5 of the bridge 3.

The two terminals of the measuring resistor 2 are respectively connected to the two inputs 20, 21 of an analog comparator 22. On its output wire 23, this analog comparator 22 gives a voltage that represents the difference in potential at the terminals of the resistor 2 and has an absolute value proportional to that of the current I flowing through the coil 1 of the linear motor.

This voltage on the wire 23 is applied to a first input of another analog comparator 24, the other input 25 of which receives the reference voltage Vc given by the general position feedback loop of the core of the linear motor coil 1.

The error voltage at output 26 of the subtractor 24 is amplified in a levelling analog amplifier 27, from which it leaves at the point 28 under reference E.

According to the invention, this error voltage E is applied to:

- a first electronic switch 29 consisting of a protection resistor 31 connected between the point 28 and the gate 30 of the transistor 14, and a diode 32 mounted in reverse between this gate 30 and the ground: this diode is on if the error voltage E is negative, and it is off if the error voltage E is positive. Consequently, the gate 30 of the transistor 14 is practically earthed if E is negative and, if this voltage E is positive, it receives said voltage E through the resistor 31;
- a second electronic switch 33 through an analog inverter 34; this switch 33 is identical to the switch 29, with series resistor 36 and diode 35 mounted in reverse between the gate 37 of the transistor 17 and the ground: given the presence of the inverter 34, the diode 35 is on if the error voltage E is positive, and it is off if this error voltage E is negative. Consequently, the gate 37 of the transistor 17 is practically earthed if the error voltage E is positive and it receives this voltage E through the resistor 36 if said voltage E is negative; and
- a "sign discriminator" 38 which has its two outputs 39 and 40 respectively connected to the gates 41 and 42 of the transistors 6 and 7 and which, if its input voltage E is positive, delivers a voltage practically equal to the supply voltage +V at its output 30 and practically equal to the ground voltage at its output 40, and vice versa if the voltage E is negative.

In practice, the sign discriminator 38 has two independent arms:

- a first arm 43 connecting the point 28 to the gate 41 of the transistor 6 and comprising, in series, an analog differential amplifier 45 that is powered by the voltage +V and has its (+) input connected to the point 28 while its (−) input is grounded, and an electronic switch 46 identical to the above-mentioned switches 29 and 33, with series resistor 47 and grounding diode 48 if any;
- a second arm 44 connecting the point 28 to the gate 42 of the transistor 10 and comprising, in series, an analog differential amplifier 49, which is supplied with the +V voltage and has its (−) input connected to the point 28 while its (+) input is grounded, and an electronic switch 50 identical to the above-mentioned switches 29, 33 and 46 with series resistor 51 and grounding diode 52 if any.

The device that has just been described works as follows:

When the position of the movable core of the actuator, or linear motor, has to be changed, the general feedback loop comprising the position changer (not shown) connected to this core gives a reference voltage Vc (not shown) at the input 25 of the comparator 24.

It has to be noted that, as explained earlier, a voltage proportional to the current I in the coil 1 is applied to the other input 23 of this subtractor 24.

The error voltage at output 26 of the subtractor 24 is brought to level by the amplifier 27, and is recovered at 28 in the form of the above-mentioned voltage E.

If this error voltage E is positive (as is the case when the linear motor has to be supplied with current I in order to shift the core in a first determined direction):

- the diode 32 is off, so that the grounding switch 29 is open and the voltage E is applied to the gate 30 of the transistor 14 through the resistor 31;
- the diode 35 is on, so that the gate 37 of the trasnsistor 17 is practically grounded;

the supply voltage +V appears at the output 43 of the differential amplifier 45, and is transmitted (because the diode 48 is then off) to the gate 41 of the transistor 6 through the resistor 47;

(the voltage −V appears at the output 44 of the differential amplifier 49, so that the diode 52 is on and the gate 42 of the transistor 10 is practically grounded.

It follows, finally, that the transistor 6 is off, the transistor 10 is saturated and, hence, totally on, the transistor 17 is off and the transistor 14 is conductive and works in linear mode with the error voltage E applied to its gate 30.

Finally, in the coil 1, there flows an instantaneous current I proportional to the error voltage E, this current I being finally servo-controlled by the reference voltage Vc and flowing from the end 13 towards the end 9 of the arm 5 of the bridge of transistors 3.

By contrast, and simply for reasons of symmetry, when the error voltage E is negative, the transistors 14 and 10 are off while the transistor 6 is totally on and therefore behaves like a short-circuit, and the transistor 17 works in linear mode, supplied at its gate with the inverted, hence positive, value of the error voltage E. The servo-controlled current I that then flows in the coil 1 has the reverse direction to the previous one.

Finally, when the error voltage E is zero, the transistors of the bridge 3 are all off, so that no current flows in the coil 1.

Finally, this device can be used to prevent unnecessary heating of the coils 1 of the linear motor when it is idle. It further has the advantage, because it works without any chopping of the current, of preventing problems related to the creation of spurious voltages in the surrounding circuits.

It goes without saying that the invention is not restricted to the above described embodiment. Thus, for example, the device could use bipolar power transistors and the sign discriminator and the two switch circuits could be made in another way.

What is claimed is:

1. A device for the electrical excitation of the coil or coils of an electromagnetic actuator, said device capable of causing a shift of said actuator in either direction, said device comprising a bridge consisting of two pairs of transistors, said bridge electrically connected to and capable of directly supplying electrical current to said coil(s) in either direction to obtain said shift of said actuator in either direction, said device further comprising means for measuring an error voltage, said error voltage being the difference between a reference voltage representing the current to be applied to said coil(s) and a voltage proportional to a current actually flowing through said coil(s), said error voltage consisting of an absolute value and a sign positive or negative; said device further comprising means which, in response to one sign of said error voltage, turns off a first pair of said two pairs of transistors of said bridge and turns entirely on one transistor of a second pair of said two pairs of transistors, while simultaneously the other transistor of said second pair of transistors is caused to operate in a substantially linear mode, causing a current proportional to said error voltage to flow through said coil(s) in a first direction, and, conversely, in response to the opposite sign of said error voltage, turns off said second pair of said two pairs of transistors of said bridge and turns entirely on one transistor of said first pair of said two pairs of transistors, while simultaneously the other transistor of said first pair of transistors is caused to operate in a substantially linear mode, causing a current proportional to said error voltage to flow through said coil(s) in a second direction.

2. An electrical excitation device according to claim 1, wherein the error voltage is applied simultaneously;

to a first electronic switch which is connected between the control electrode of the first transistor of said second pair of the bridge and a potential for turning off this very transistor, said switch being actuated by the sign of this error voltage and then to turn this transistor off, when this error voltage has a first sign (−), and to be open when this error voltage has the opposite sign (+) in order to enable this same transistor to work in an essentially linear mode;

through an analog inverter to a second electronic switch similar to the first one, this second switch being, just as for the first switch, connected between the control electrode of the first corresponding transistor of the first pair of the bridge and a potential for turning off this transistor, this second switch being actuated by the sign of this error voltage inversely with respect to the first switch, namely actuated to be closed, and then turn this transistor off, when this error voltage has the opposite sign (+), and, when this error voltage has the first sign (−), actuated to be open in order to enable this same transistor to work in a substantially linear mode; and to a sign discriminator controlled by the sign of this error voltage so as to apply a switch-off voltage to the second transistor of one pair of transistors, the first transistor of which is turned off by this error voltage, and so as to apply a saturation voltage to the second transistor of the other pair.

3. An electrical excitation device according to claim 2, wherein the sign discriminator has two independent arms each comprising, in series, an analog differential amplifier and an electronic switch similar to the two above-mentioned electronic switches, the error voltage being, applied to an input terminal with a first sign (+) for the differential amplifier of a first arm, and to the input terminal with the other sign (−) for the differential amplifier of the second arm, the other input terminal of each of these two differential amplifiers being connected to the ground.

4. A device for the electrical excitation of at least one coil of an electromagnetic actuator for shifting in either direction a current flow in said coil comprising: a bridge of transistors connected to directly supply current to said coil, in either direction; means for measuring an error between a reference voltage representing current to be applied to said coil and a voltage proportional to a current flowing through said coil and providing an error signal in accordance with said measurement; means for providing, when said error signal is of one sense, a turn off of a pair of transistors of the bridge which, if they were on, would make the current flow in a first direction in said coil and, a turn on of the transistors of the other pair; said transistors of said other pair working in a substantially linear mode, whereby the current flowing through said other pair of transistors and therefore flowing through said coil is in the second direction varies practically linearly with said error signal; and said means for providing when said error signal is of an opposite sense, a turn off of the two transistors of said other pair and a turn on of the two transistors of the first pair, with one transistor of said first pair being totally on while the other transistor of said first pair works in a substantially linear mode so that the current, which then flows through the coil in said first direction varies, practically linearly with the error signal.

5. An electrical excitation device according to claim 4, wherein the error signal is applied simultaneously;

to a first electronic switch having a diode, which is connected between a control electrode of a first transistor of said other pair of the bridge and a reference potential for turning off said transistor, said switch being actuated by the sign of said error signal, whereby said switch turns said transistor off, when said error signal has a first sign and turns said transistor on when said error signal has the opposite sign (+) in order to enable said transistor to work in said practically linear mode;

through an analog inverter to a second electronic switch similar to the first one, said second switch being, connected between a control electrode of a first transistor of the first pair of the bridge and a reference potential for turning off said transistor, said second switch being actuated by the sign of said error signal inversely with respect to the first switch, namely actuated to be closed, and then turn said transistor off, when error signal has the opposite sign and, when said error signal has the first sign (−), actuated to be open in order to enable said transistor to work in a substantially linear mode; and to a sign discriminator controlled by the sign of said error signal so as to apply a switch-off voltage to a second transistor of one pair of transistors, the first transistor of which is turned off by said error signal and to apply a saturation voltage to the second transistor of the other pair.

6. An electrical excitation device according to claim 5, wherein the sign discriminator has two independent arms each comprising, in series, an analog differential amplifier and an electronic switch similar to said two electronic switches, the error signal being applied to an input terminal with a first sign for the differential amplifier of a first arm, and to an input terminal with the other sign (−) for the differential amplifier of the second arm, an other input terminal of each of these two differential amplifiers being connected to ground.

* * * * *